(No Model.) 7 Sheets—Sheet 1.
W. L. CASADAY.
WHEEL PLOW.

No. 498,704. Patented May 30, 1893.

Witnesses
Inventor
William L. Casaday
By Franck W. Johns
Attorney

THE NORRIS PETERS CO., PHOTO-LITHO., WASHINGTON, D. C.

(No Model.)  7 Sheets—Sheet 2.

W. L. CASADAY.
WHEEL PLOW.

No. 498,704.  Patented May 30, 1893.

Witnesses

Inventor
William L. Casaday
By Franck W. Johns
Attorney (No Model.) 7 Sheets—Sheet 4.

W. L. CASADAY.
WHEEL PLOW.

No. 498,704. Patented May 30, 1893.

Fig. 4.

Fig. 20.

Witnesses

Inventor
William L. Casaday
By Franck W. Johns
Attorney (No Model.)
W. L. CASADAY.
WHEEL PLOW.
No. 498,704.
7 Sheets—Sheet 5.
Patented May 30, 1893.
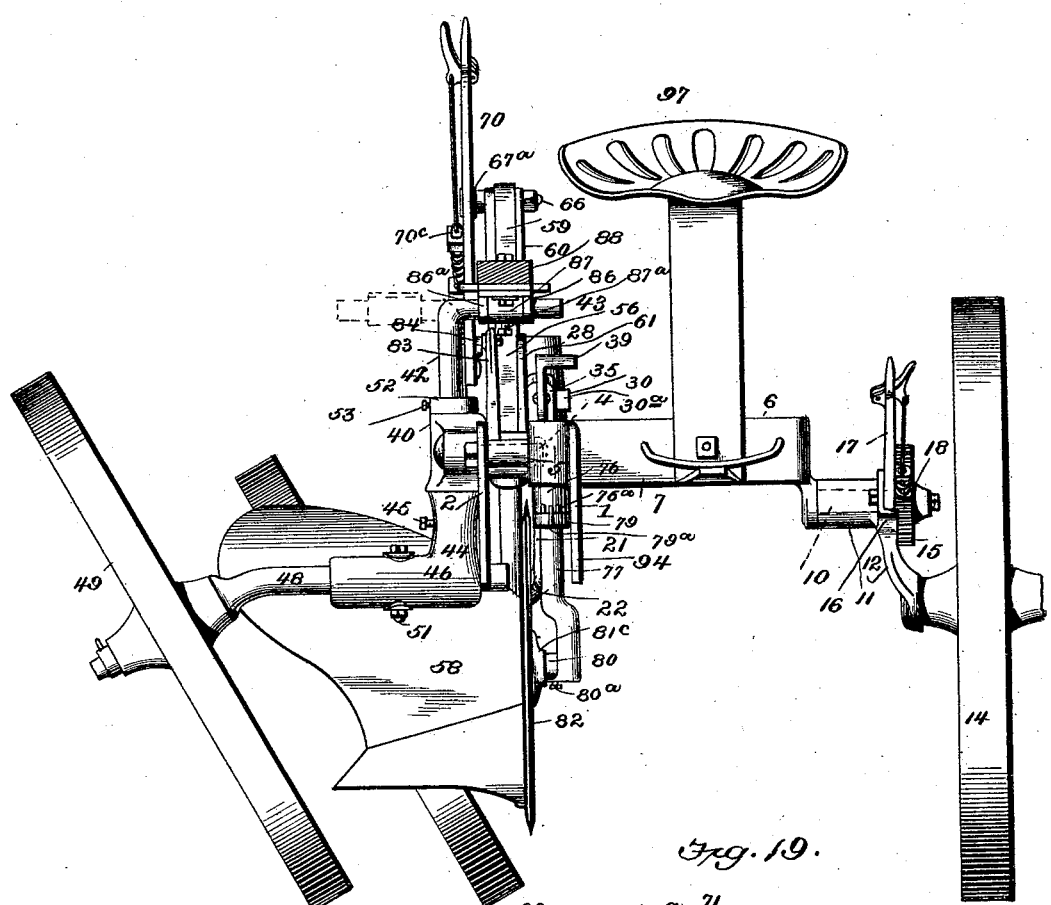

(No Model.) 7 Sheets—Sheet 6.
W. L. CASADAY.
WHEEL PLOW.
No. 498,704. Patented May 30, 1893.
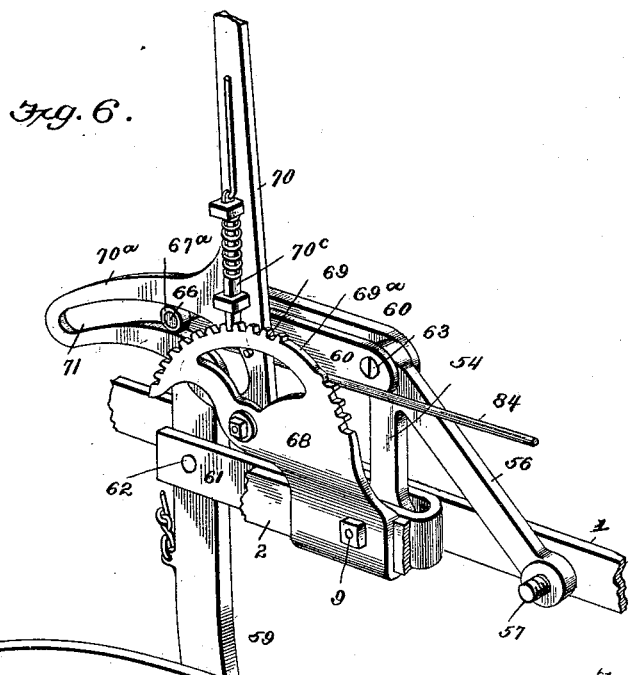
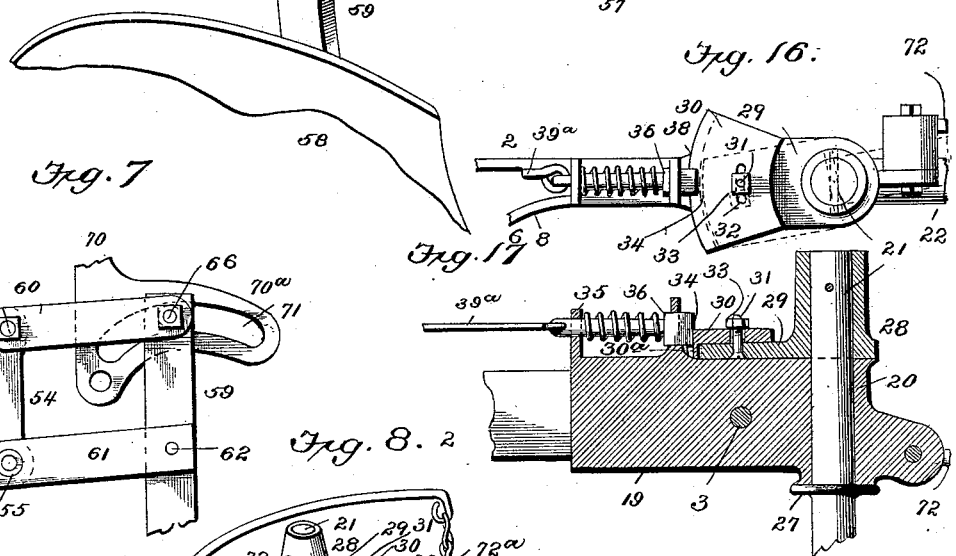
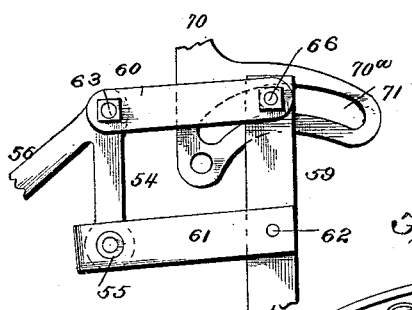
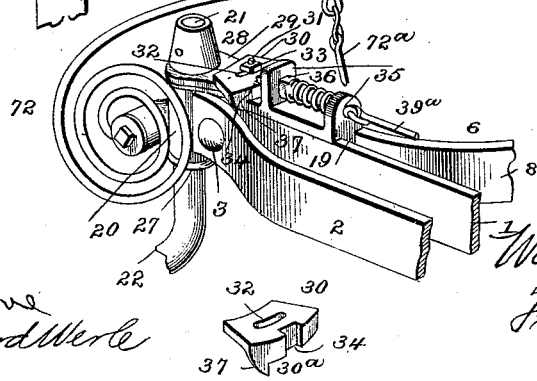
Witnesses
Inventor
William L. Casaday
By Franck D. Johns
Attorney (No Model.) 7 Sheets—Sheet 7.

W. L. CASADAY.
WHEEL PLOW.

No. 498,704. Patented May 30, 1893.

Witnesses

Inventor
William L. Casaday
By Franck D. Johns
Attorney

THE NORRIS PETERS CO., PHOTO-LITHO., WASHINGTON, D. C.

UNITED STATES PATENT OFFICE.

WILLIAM L. CASADAY, OF SOUTH BEND, INDIANA.

WHEEL-PLOW.

SPECIFICATION forming part of Letters Patent No. 498,704, dated May 30, 1893.

Application filed February 7, 1893. Serial No. 461,347. (No model.)

*To all whom it may concern:*

Be it known that I, WILLIAM L. CASADAY, a citizen of the United States, residing at South Bend, in the county of St. Joseph and State of Indiana, have invented certain new and useful Improvements in Wheel-Plows; and I do hereby declare the following to be a full, clear, and exact description of the invention, such as will enable others skilled in the art to which it appertains to make and use the same.

My invention relates to certain improvements in wheel plows, particularly to that class of plows in which three wheels are employed.

My said invention consists in certain novelty in the construction, arrangement and combination of the various parts of the same, all of which I will now proceed to point out and describe, reference being had to the accompanying drawings, in which—

Figure 1:
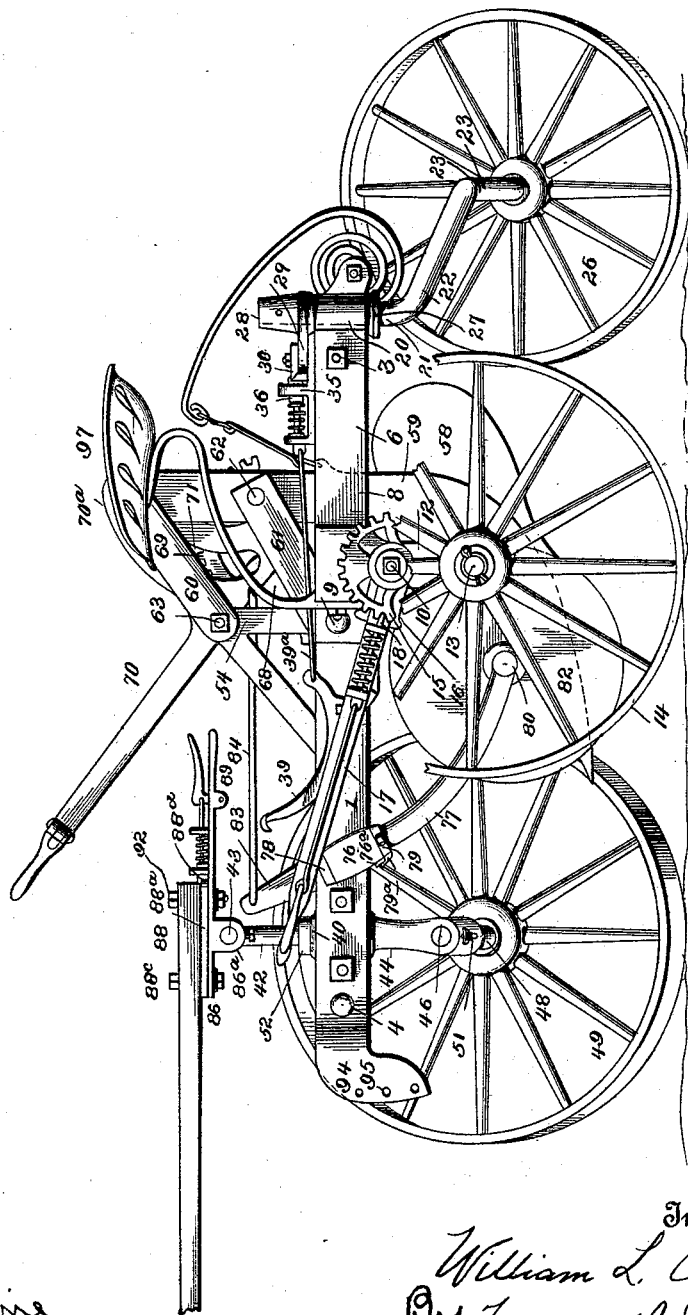
Figure 2:
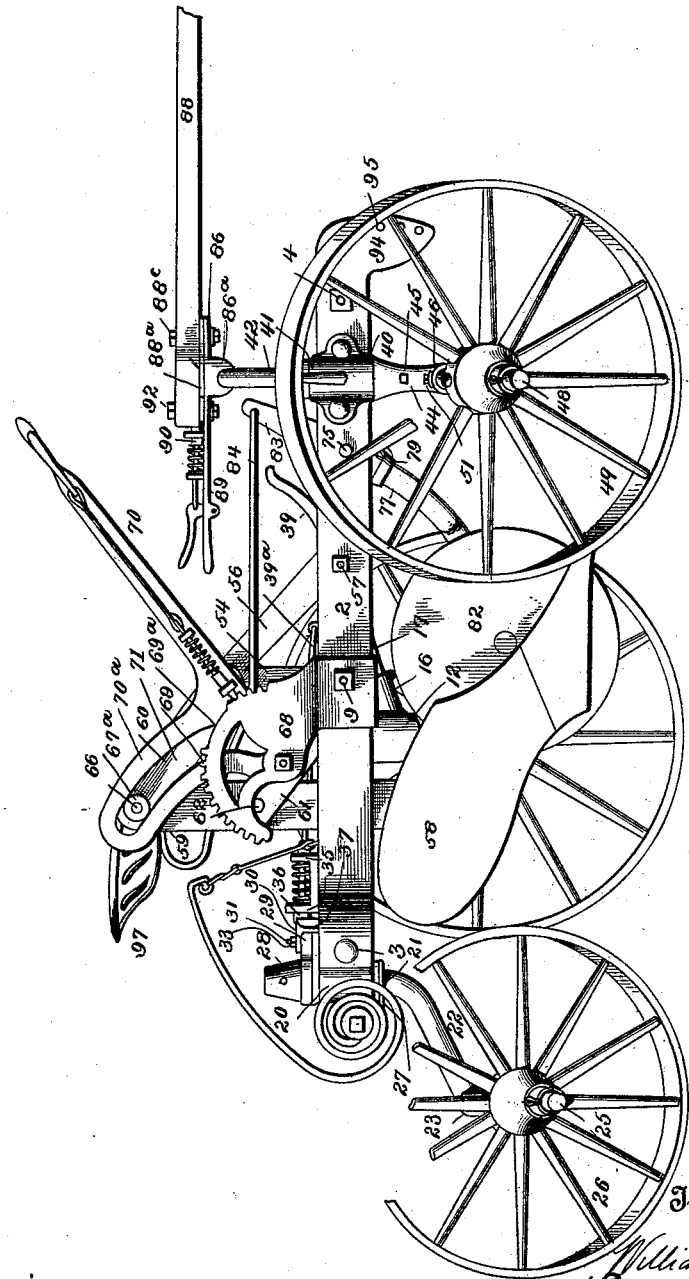
Figure 3:
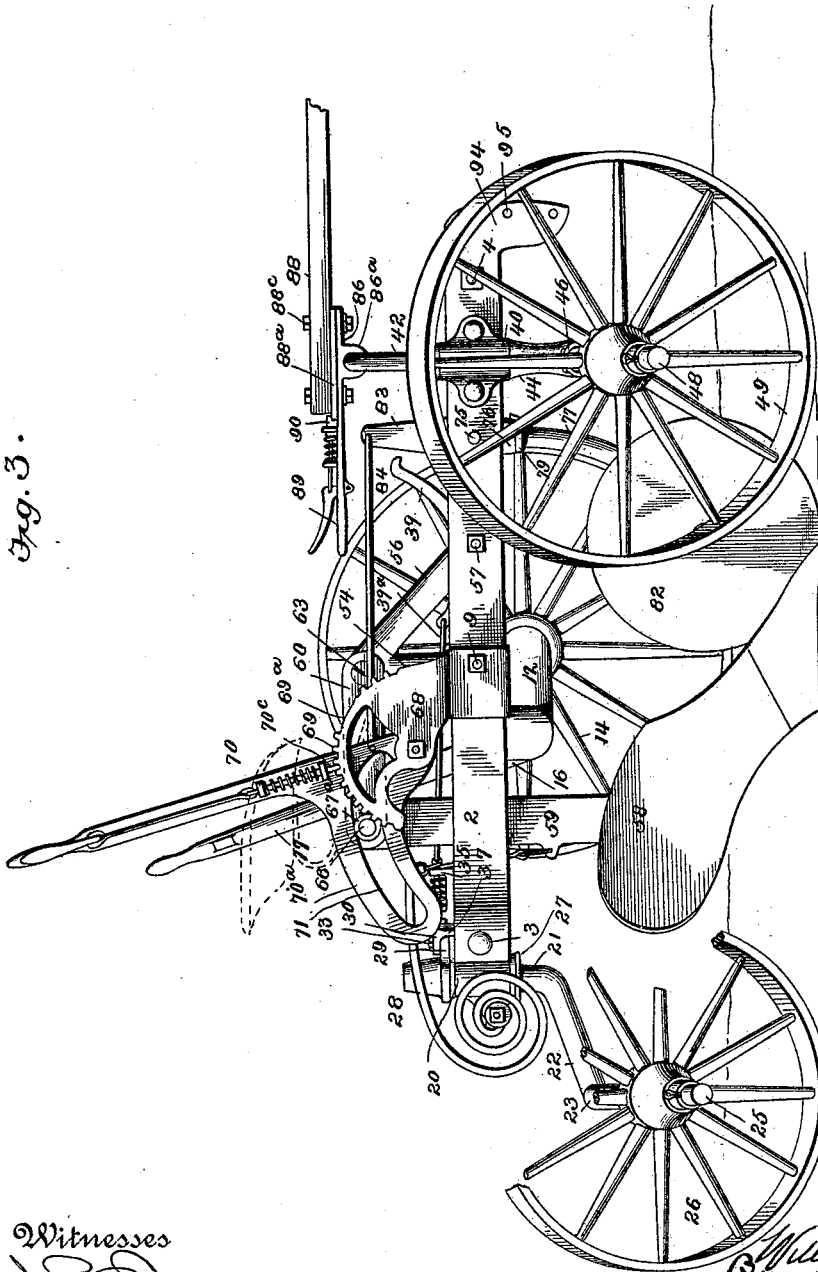
Figure 13:
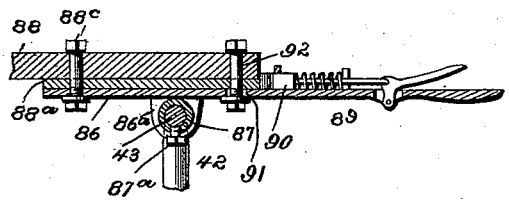
Figure 9:
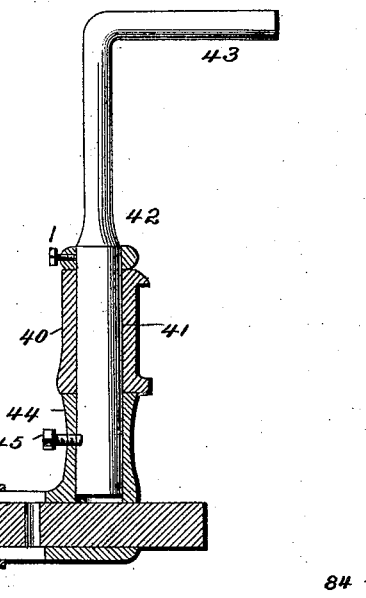
Figure 10:
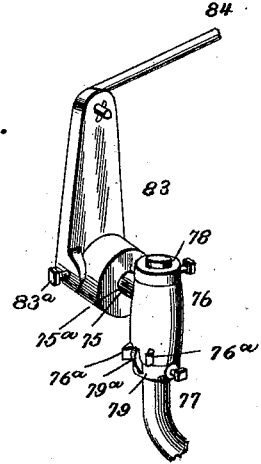
Figure 11:
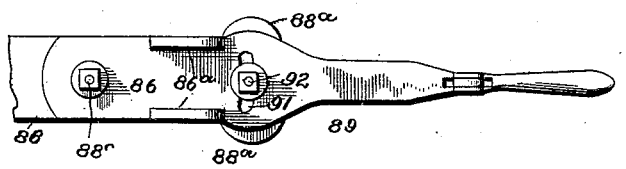
Figure 12:
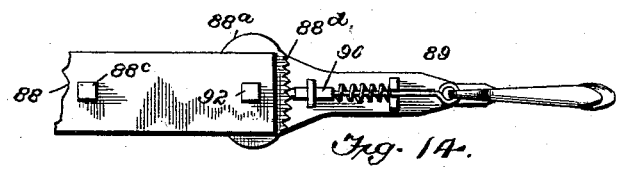
Figure 14:
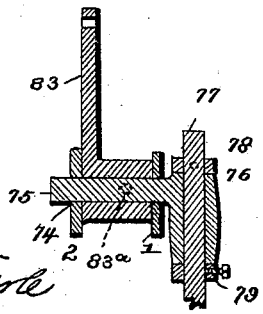
Figure 15:
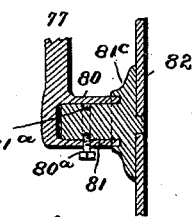

Figure 1 is a side elevation of the landside of a wheel plow embodying my invention, the plow being shown raised in an inoperative position. Fig. 2 is a side elevation of the furrow side of the plow, said plow being raised. Fig. 3 is a similar elevation, the plow being lowered and in an operative position. Fig. 4 is a top plan view. Fig. 5 is a front elevation, showing the plow in an inoperative position, colter and landside wheel when in operation. Fig. 6 is a detail perspective of the mechanism employed to raise and lower the plow. Fig. 7 is a further detail of said mechanism in elevation. Fig. 8 is a detail perspective of the counter balance spring for automatically raising the plow and mechanism for adjusting the rear furrow wheel to or from the furrow. Fig. 9 is a detail partly in section of the axle of the forward furrow wheel and its bearing. Fig. 10 is a detail perspective of the mechanism for operating the colter. Figs. 11 and 12 are details of the lever attached to the tongue for guiding the plow and mechanism for adjusting the front furrow wheel to run to or from the furrow. Figs. 13, 14, 15, 16, 17, 18, 19 and 20 are details of various minor parts of the invention.

Referring to said drawings: The frame of the machine consists of two straight flat parallel bars 1 and 2, the rear end of the furrow side bar being bent inwardly and secured to the landside bar 1 by a bolt 3. The forward ends of the bars are secured by a bolt 4 having mounted thereon and interposed between said bars a sleeve 5 which holds the bars the required distance apart. To the rear part of the landside bar is secured the land wheel frame or brace 6, which is substantially triangular in form and consists of the straight member 7 and rearwardly curved member 8. Said curved member 8 is secured to the rear end of the bar 1 by the bolt 3. The forward straight member is secured to the bar 1, by a bolt 9 which passes through both bars 1 and 2, for the purpose hereinafter described. The member 7 projects at right angles to the said land side bar.

On the outer end of the land wheel frame is formed a spindle 10 which also projects at right angles to said landside bar. 11 is a collar mounted on said spindle and having a radially projecting arm 12, on the end of which is formed a projecting spindle 13 upon which the land wheel 14 is mounted.

15 is a toothed sector rigidly secured to the outer end of the spindle 10.

16 is a seat formed on the collar 11 in which is rigidly secured the land wheel lever 17, by means of which the said wheel may be raised or lowered. Said lever is provided with a spring locking dog 18 which engages the toothed sector and locks the wheel when adjusted to the desired position.

19 is a short flat bar secured between the rear ends of the bar 1 and member 8 of the land wheel frame. 20 is a vertical bearing formed on the rear end of said bar 19 and is located at the extreme rear end of the frame. In said bearing is journaled a crank axle consisting of an upper vertical member 21 journaled in the bearing, a rearwardly and downwardly inclined intermediate member 22 and a downwardly inclined member 23 arranged substantially at right angles to the intermediate member. On the end of the member 23 is formed a spindle 25, upon which is journaled the rear or caster wheel 26. Said wheel follows in the furrow which is being turned by the plow, and the inclination of the crank axle causes it to run at an angle to the wall of said furrow. The intermediate member is of sufficient length to permit the wheel to clear the plow when turning. The length of the downwardly inclined member being such that said wheel will engage the bottom of the wall of said furrow. The vertical member of the axle projects through the bearing and is provided with an annular shoulder 27 which engages the under side of said bearing. 28 is a cap rigidly secured to the top of said vertical member. Formed integral with the cap and projecting at right angles from the vertical member is a flat projection or arm 29, having a curved end extending over the rear end of the frame.

30 is a flat segmental plate, having beveled ends, and is attached to the flat plate or arm 29 by means of a bolt 31 secured to said plate or arm 29 and extending through a segmental slot 32 in the plate 30, said bolt being provided with a binding nut 33. The said plate 30 is provided with a downwardly projecting flange 30ª, which engages the outer end of the plate 29, and a central locking notch or recess 34.

35 are bearings formed on the upper edge of the bar 19, in which is mounted a spring actuated dog 36. Said dog is adapted to engage the notch or recess 34 and lock the axle of the rear wheel in its bearing.

When it is desired to have the rear wheel run in a line parallel with the wall of the furrow the segmental plate is secured upon the flat plate or arm 29 so that the locking notch will come exactly at the center of the same. The wheel may however be set to run to or from the furrow, by releasing the binding nut 33, and moving the segmental plate to the right or left, the segmental slot 32 permitting said movement. When the desired angle is reached the nut is clamped and when the dog 36 engages the locking notch said rear wheel will be caused to run either to or from the furrow as adjusted.

37 is a stop on the segmental plate which engages a stop 38 on the bar 19 and limits the movement of the rear wheel toward the landside or wall of the furrow.

39 is a bell crank foot lever pivoted to the landside bar and connected with the spring actuated dog by a rod 39ª, by means of which the dog may be released from the locking notch. In turning the dog is released by means of the foot lever and the axle of the rear or caster wheel is free to move in its bearing and permit the rear or caster wheel to turn. When the furrow is again started the said rear wheel swings into line and is automatically locked when the plow is in the ground.

40 is a bracket or casting secured to the furrow side bar of the frame, near its forward end, by suitable bolts. 41 is a vertical bearing formed in said bracket. In said bearing is mounted a vertical shaft 42 extending entirely through the same and having on its upper end an arm 43 arranged at right angles to said vertical shaft for a purpose hereinafter described.

44 is a sleeve mounted upon the lower end of the vertical shaft 42 and attached thereto by a set screw or bolt 45.

46 is a horizontal axle bearing, formed integral with the sleeve, and projecting, at right angles therefrom. Said axle bearing is provided with upper and lower vertical slots 47 registering with each other.

48 is a crank axle for the front or furrow wheel, said axle being mounted in the bearing 46. The crank end of said axle forming a spindle for the furrow wheel 49. Said crank end or spindle being arranged at such an angle that the furrow wheel will incline and be at an angle to the wall of the furrow. The wheel being adapted to engage with the bottom of said wall and regulate the width of the furrows. The portion of the axle mounted in the bearing is provided with a series of holes 50. The axle may be of any desired length and may be moved in or out to adjust the plow to take more or less ground. When adjusted to the desired position the axle is locked in place by a bolt 51 passing through the slots in the axle bearing and the proper hole in the axle and provided with a clamping nut. Instead of the series of holes a set screw may be employed.

52 is a collar mounted on the vertical shaft above its bearings and is provided with a set screw 53. This prevents the shaft from slipping down and the furrow wheel from dropping when the plow is forced into the ground.

The furrow wheel may be adjusted to run to or from the wall of the furrow by means of mechanism hereinafter described.

54 is a standard secured between the bars 1 and 2 by the bolt 9. Upon said bolt is mounted a sleeve 55 of the same length as the sleeve 5 thus keeping the bars of the frame equi-distant throughout their length and preventing the plow-standard which passes between the same, as hereinafter described from being jammed between the same when the bolts are tightened. Said standard is arranged at right angles to the frame and has formed integral therewith an inclined brace 56 the lower headed end of which is secured between the bars of the frame by a bolt 57.

58 is a plow which is constructed without a landside or bar and is supported by a straight standard 59 which extends up between the bars of the frame. Said standard is arranged so that it will be at right angles to the share and bottom. The plow standard is connected to the standard 54 by upper and lower parallel links 60 and 61 pivoted to both standards and of equal length between their pivotal points. The distance between the pivotal points on the plow standard also being the same as the distance between the pivotal points on the upright standard secured to the frame, the lower link 61 is formed by bending a flat piece of metal into a U-shape which embraces the standard 54, the forward end being pivoted on the sleeve 55 which surrounds the bolt 9, the rear end being pivoted to the plow standard by a rivet or bolt 62. The upper link 60 is formed by two pieces, the forward ends of which are placed on either side of the upper end of the standard 54 and are pivoted thereto by a bolt 63. Said bolt 63 is provided on its head with spurs 64 which engage recesses 65 in one of the pieces of the link as shown in Fig. 18. Instead of these spurs a sleeve may be used, to prevent clamping when the bolts are tightened. The rear end of said link 60 is pivoted to the upper end of the plow-standard by a bolt 66, surrounded by a sleeve 67 which prevents clamping. Said bolt is extended on the furrow side and has mounted thereon a roller 67$^a$.

68 is a plate secured to the furrow side of the frame by the bolt 9 and has formed integral therewith a mutilated toothed sector 69, having an interval as at 69$^a$, where the teeth are omitted.

70 is an operating or lifting lever pivoted or fulcrumed to the sector and provided with a spring cog 70$^c$ adapted to engage the teeth of the sector and to move freely over the interval. Said lever is also provided with an arm 70$^a$, having formed therein a cam shaped slot 71 with which the roller 67$^a$ engages.

When the spring dog is released from the teeth of the sector, and the lever is moved back or forward, it will be seen from the above description that parallel motion is produced. The standard being at right angles to the share and bottom of the plow and also at right angles to the frame, the share and bottom of the plow is therefore parallel with said frame and will always be parallel with same whether raised or lowered, thus causing the plow to run "level" when at work. To open the first furrow the lever is drawn back, the roller engaging the cam slot gives the desired throw to the plow, forcing the point of the same into the ground. Any desired depth may be plowed by locking the lever by its spring dog to the desired point on the sector. When the first furrow is finished the land wheel is raised by its lever and the plow leveled.

In using a plow such as I have described the rear or caster wheel acts as a landside bar to steady the plow.

Secured to the rear bearing or to the frame proper is a spring 72, the free end of which is connected by a link 72$^a$, with the standard of the plow. Said spring is of sufficient strength to raise the plow out of the ground and hold the same elevated when the dog is released from the teeth of the sector. Thus when it is desired to raise the plow the spring dog is unlocked, and the lever moved forward until said dog strikes the interval in the sector. The lever is then released, the spring operating automatically to raise the plow, the spring dog passing over the interval to the next tooth of the sector which is beveled on its rear side. Said dog then engages this tooth and locks the plow in an elevated position.

74 are bearings in the bars 1 and 2 in which is mounted a short shaft 75 on the landside end of which is formed a bearing 76.

77 is a single bent arm the upper end of which is mounted in the bearing 76 and held therein by collars 78 and 79 provided with set screws. On the lower end of said arm is formed a journal box 80 in which is journaled the journal 81 of a rolling colter 82. Said colter being held in place by a set screw 80$^a$, in the journal box, engaging with an annular groove 81$^a$ in the journal. Surrounding the journal and projecting from the colter is an annular flange 81$^c$, beveled on its outer side which embraces the end of the journal box, rendering the same dirt proof and leaving but little of the box or hub exposed to catch dirt in sticky ground. The colter is so arranged that when in operation the center of the colter will come about over the point of the plow. On the lower sleeve 79 is a stop 79$^a$, which engages with stops 76$^a$, on the bearing 76 and limits the lateral play and swing of the colter, but by reversing the collar the swing of the colter will not be limited. The arm carrying the colter may be moved up or down to give the colter the desired vertical adjustment.

83 is a lever mounted on the short shaft 75 and keyed thereto by a set screw 83$^a$, engaging a longitudinal seat 75$^a$ in said shaft. By releasing the set screw the shaft carrying the colter may be moved in or out to adjust said colter to take more or less land. The lever 83 is connected by a rod 84 with the lifting lever 70 the same lever thus operating both the plow and colter raising or lowering the same simultaneously. The colter being supported upon a single arm instead of a yoke prevents clogging and trash from winding around the box or hub. This is a great advantage over the yokes generally used with this class of colters.

86 is a plate hinged or pivoted to the arm 43 of the vertical shaft 42, by depending lugs 86$^a$.

87 is a collar mounted upon the arm between the lugs and provided with a set screw 87$^a$. By adjusting the collar the plate may be hinged at any desired point on the arm.

88 is a tongue having secured to the under side of its rear end a plate 88$^a$. Said tongue is pivoted to the plate 86 by a bolt 88$^c$ at a point forward of its rear end.

89 is a guiding lever formed integral with the plate 86 and projecting back from the tongue, within convenient reach of the driver. Said lever being connected with the forward furrow wheel through the intermediate mechanism described, the direction of the wheel can be controlled by the operator thus guiding the plow. The plate 88$^a$ is enlarged at its rear end and is provided with notches or a rack 88$^d$.

90 is a spring actuated dog which engages with the teeth 88$^d$ and holds the tongue at the desired angle to the arm 43.

91 is a segmental slot in the plate 86.

92 is a bolt or pin depending from the rear end of the tongue and engaging with the segmental slot limits the adjustment of said tongue.

By means of the construction just described, the front furrow wheel may be caused to run substantially parallel with, or to or from the furrow wall. It will readily be seen that the tongue being between the neck yoke of the team, it will substantially be held in the line of draft and when set at right angles to the arm 43, will hold the furrow wheel substantially parallel with the wall of the furrow. By releasing the spring dog and causing it to engage with the notches on the right of the center of the tongue an acute angle will be formed between the tongue and arm on the right or furrow side thus throwing the arm back and causing the wheel to run toward the furrow. By reversing this adjustment an obtuse angle will be formed between said arm and tongue bringing the arm forward and causing the furrow wheel to run from the furrow. When two horses are used the arm 43 projects over the frame bringing the tongue over the center of said frame. When three horses are to be used, the bolt or set screw of the shaft 42 is released, the arm turned half around bringing the tongue to the right of the frame shown in figure.

It will be noted that the tongue has an up and down movement or swings on the arm 43 to which it is pivotally connected and as the shaft 42 is free to turn in its bearings it also has a side movement. Said tongue is thus connected with the frame by a substantially universal joint. This effectually prevents any side draft on the team or any side and down draft upon the necks of said team. This is a great advantage as the side draft has been found heretofore to be one of the greatest objections to plows of this class.

The forward ends 94 of the bars 1 and 2 are bent down and provided with holes 95, the holes in one portion registering with the holes in the other portion thus forming a clevis upon the frame which will possess the maximum of strength.

97 is the driver's seat.

From the above description the operation and advantages of my improved wheel plow will readily be seen.

I dispense with the plow beam and frames heretofore used and in effect produce a combined frame and beam. The mechanism described for raising and lowering the plow is such that the plow always runs level. Said mechamism is simple and effective and can be readily and easily operated. The automatic means for raising the plow enable any one capable of driving the team to operate the plow. The adjustment of the furrow and rear wheels as set forth is of the greatest advantage.

By attaching the tongue to the frame by a substantially universal pivotal connection all side or down draft upon the team is overcome and all injury to the necks or shoulders of the horses or jamming of said horses' shoulders is prevented.

It is apparent that various changes may be made in the details of the construction herein shown without departing from the spirit and scope of my invention and I do not wish to be understood as limiting myself to said specific construction.

Having thus fully described my invention, what I claim as new, and desire to secure by Letters Patent, is—

1. In a wheel plow, the combination with a frame, of a vertically movable plow standard, arranged at right angles to the frame and carrying a plow having its bottom and share at right angles to the standard and parallel with the frame, parallel links of equal length pivotally connecting the plow standard and frame and having equal distances between their pivotal points, and means for raising and lowering the plow standard, substantially as shown and described and for the purpose set forth.

2. In a wheel plow, the combination with a frame having an upright standard secured thereto, of a vertically movable plow standard carrying a plow, parallel links of equal length pivotally connecting the plow standard and upright standards and having equal distances between their pivotal points on said standards, an operating lever having a cam shaped slot, a bolt or projection on the plow standard engaging the cam shaped slot, whereby the standard and plow are raised or lowered by the lever, substantially as shown and described.

3. In a wheel plow, the combination with a frame having an upright standard secured at right angles thereto, of a vertically movable plow standard arranged at right angles to the frame and carrying a plow having its bottom and share at right angles to the standard and parallel with the frame, parallel links of equal length pivotally connecting the plow standard and upright standard and having equal distances between their pivots on said standards, a toothed sector secured to the frame, an operating lever pivoted to said sector and provided with a spring locking dog, and a cam shaped slot, a bolt or projection on the upper end of the plow standard engaging the cam shaped slot, whereby the standard is raised or lowered, substantially as shown and described.

4. In a wheel plow, the combination with a frame having an upright standard secured at right angles thereto, of a vertically movable plow standard arranged at right angles to the frame and carrying a plow having its bottom and share at right angles to the standard and parallel with the frame, parallel links of equal length pivotally connecting the plow standard and upright standard and having equal distances between their pivots on said standards, means for raising and lowering the standard, whereby the plow bottom and share will always remain parallel with the frame and will run "level" when in operation, substantially as shown and described.

5. In a wheel plow, the combination with a frame consisting of two straight parallel bars secured together and having an upright standard secured thereto, of a straight plow standard mounted between said bars and arranged at right angles thereto, a plow secured to said standard and having its bottom and share at right angles thereto, and parallel with the frame, parallel links of equal length pivotally connecting the plow standard and upright standard, and having equal distances between their pivots on said standards, a toothed sector secured to the frame, an operating lever pivoted to said sector and provided with a spring locking dog and having a cam shaped slot, a bolt or projection on the plow standard carrying a roller engaging the cam slot in the lever, all constructed, arranged and operating substantially as shown and described.

6. In a wheel plow, the combination with a frame, a plow standard carrying a plow and pivotally connected to said frame, of a mutilated toothed sector secured to said frame and having an interval as described, an operating lever having a spring dog adapted to engage the toothed sector and connected with the plow standard, a counter balance spring secured to the frame and connected with the plow standard, all constructed, arranged and operating, substantially as set forth, whereby when the spring dog is released from the teeth of the sector and engages the interval it will automatically raise the plow.

7. In a wheel plow, the combination with a frame, a plow standard carrying a plow and pivotally connected to said frame, of a mutilated toothed sector 69 secured to the frame and having an interval 69$^a$, an operating lever 70, connected with the plow standard and having a spring dog 70$^c$, adapted to engage the sector, a spring, 72 secured to the frame and connected to the plow standard by a link 72$^a$, all constructed, arranged and operating, substantially as shown and described.

8. In a wheel plow the combination with the frame carrying a plow, an operating lever connected with said plow and a transverse bearing formed on the frame, of a short shaft mounted in said transverse bearing and laterally adjustable with relation to the frame, a bearing formed on the landside end of said shaft, a vertically adjustable arm mounted in said bearing and carrying on its lower end a rolling colter, a lever keyed upon the short shaft and a rod connecting said lever and the operating lever, all constructed, arranged and operating, substantially as shown and described.

9. In a wheel plow, the combination of the frame, the bearing 76 connected with said frame, the arm 77 mounted in said bearing, carrying on its lower end a rolling colter, the upper securing collar 78 and lower reversible securing collar 79 provided with a stop 79$^a$ and the stops 76$^a$ on the bearing, all constructed, arranged and operating, substantially as shown and described.

10. The combination of the single bent arm 77 secured to the frame and having a journal box 80, on its lower end, the rolling colter 82 having a journal 81 mounted in the journal box and provided with annular groove, an annular flange 81$^c$ surrounding the journal and overlapping the journal box and a retaining screw in said journal box engaging the annular groove in the journal, substantially as shown and described.

11. In a wheel plow, the combination with a frame having a vertical bearing formed on its rear end, of a crank axle mounted in said bearing and carrying a rear or caster wheel, an arm 29 rigidly secured to the upper end of said axle, an adjustable segmental plate 30 secured to said arm and provided with a locking notch 34, a spring dog adapted to engage said notch and lock the wheel in position when plowing, and an unlocking lever connected with said dog and controlled by the operator, all constructed, arranged and operating, substantially as shown and described, whereby the rear or caster wheel may be set to run to or from the furrow when in operation.

12. In a wheel plow, the combination with the frame and a vertical bearing secured to the furrow side of said frame near its forward end, of a shaft mounted in said bearing, a substantially horizontal bearing secured to the lower end of said shaft, a longitudinally adjustable crank axle mounted in said bearing and carrying a furrow wheel, an arm formed on the upper end of the shaft and projecting at right angles therefrom and a tongue adjustably connected with said arm, whereby the angle of said tongue with relation to the arm may be regulated to cause the furrow wheel to run to or from the furrow, all constructed, arranged and operating, substantially as shown and described.

13. In a wheel plow the combination with the frame, a vertical bearing secured to the furrow side of said frame near its forward end, of a vertical shaft mounted in said bearing, a substantially horizontal bearing secured to its lower end, a crank axle carrying a furrow wheel mounted in bearing, and an arm formed on the upper end of the shaft and projecting at right angles thereto, of a plate 86, a rearwardly extending guiding lever formed integral with the plate, a tongue pivoted to said plate and provided with a rack or notches 88$^d$ at its rear end, and a spring actuated locking dog 90, adapted to engage said rack or notches and hold the tongue at any desired angle to the arm causing the furrow wheel to run to or from the furrow according to the adjustment of the tongue, when the plow is in operation, substantially as shown and described.

14. In a wheel plow, the combination with the frame, a vertical bearing secured to said frame, a shaft mounted in said bearing, and an arm formed on the upper end of said shaft and projecting at right angles thereto, a tongue hinged to said arm and provided with a rearwardly extending guiding lever, all constructed and arranged substantially as shown and described, whereby the tongue has a substantially universal connection with the frame, for the purpose specified.

15. In a wheel plow, the combination with the frame, and the vertical bearing secured to the furrow side near its forward end, of the reversible shaft mounted in said bearing, and having an arm formed on its upper end and projecting at right angles therefrom, and the tongue detachably connected to said arm, all constructed, and arranged, substantially as shown and described, whereby the arm may be placed over the frame or to the right thereof, for the purpose specified.

In testimony whereof I affix my signature in presence of two witnesses.

WILLIAM L. CASADAY.

Witnesses:
OWEN D. MYERS,
HOWARD OREN.